United States Patent

[11] 3,567,874

| [72] | Inventor | Robert T. Strobel<br>Detroit, Mich. |
|---|---|---|
| [21] | Appl. No. | 880,333 |
| [22] | Filed | Nov. 26, 1969 |
| [45] | Patented | Mar. 2, 1971 |
| [73] | Assignee | General Motors Corporation<br>Detroit, Mich. |

[54] ELECTRICAL SLIDE SWITCH WITH IMPROVED CONTACT CARRIER LATCHING MEANS
3 Claims, 4 Drawing Figs.

[52] U.S. Cl.................................................... 200/16,
200/77
[51] Int. Cl.............................................. H01h 15/00,
H01h 15/18
[50] Field of Search.......................................... 200/16, 76,
77, 78, 161

[56] References Cited
UNITED STATES PATENTS

| 2,512,788 | 6/1950 | Brown et al.................. | 200/161X |
| 3,184,557 | 5/1965 | Clarey.......................... | 200/76X |
| 3,211,154 | 10/1965 | Becker et al................. | 200/16X |

Primary Examiner—Robert K. Schaefer
Assistant Examiner—J. R. Scott
Attorneys—W. E. Finken and D. L. Ellis ABSTRACT: An electrical switch assembly includes a shaft member resiliently maintained in a neutral position and slidably carrying a spring-biased shuttle member. The shaft member is bodily shiftable in a first direction from the neutral position and operable to move the shuttle member to an active position in which the latter is maintained by a detent lever while the shaft member is resiliently returned to the neutral position. The shaft member is bodily shiftable in the opposite direction from the neutral position to activate release means to disengage the detent lever from the shuttle member so that the latter may be displaced from the active position.

PATENTED MAR 2 1971

3,567,874

INVENTOR.
Robert T. Strobel
BY
D. L. Ellis
ATTORNEY

ELECTRICAL SLIDE SWITCH WITH IMPROVED CONTACT CARRIER LATCHING MEANS

This invention relates generally to electrical switch assemblies and in particular headlamp and other automotive-type switches.

In design of automobile-type instrument panels one important criterion in the placement of vehicular controls is the desire to minimize the possibility of inadvertent deactivation during operation of the vehicle. More particularly, the typical vehicle headlamp switch is located in an area on the instrument panel somewhat remote from the other controls so that the hand of the operator would not usually be in the area unless deactivation of the headlamp was desired. An electrical switch assembly according to this invention, when embodied in a vehicle headlamp switch located as described, provides a positive latching feature which requires an additional intentional act by the vehicle operator in addition to bringing a hand into the remote area of the instrument panel in order to deactivate the switch.

A primary feature, then, of this invention is that it provides an improved electrical switch assembly. Another feature of this invention is that it provides an improved electrical switch assembly including a shaft member resiliently maintained in the neutral position yet momentarily movable in one direction from the neutral position to activate the switch and momentarily movable in the opposite direction from the neutral position to deactivate the switch. A further feature of this invention resides in the provision of a collar member on the axially shiftable shaft member which collar member always returns with the shaft member to a nonprojecting position against the instrument panel, and a button member within the collar member requiring conscious depression to deactivate the switch. Yet another feature of this invention resides in the provision in the switch assembly of detent means operable upon momentary movement of the shaft member in the first mentioned direction to releasably maintain in an active position a shuttle member mounted on the shaft member while the latter is returned to the neutral position. Yet another feature of this invention resides in the provision of release means operable by the shaft member upon momentary movement thereof from the neutral position in the second mentioned direction to operate the detent means to release the shuttle member from the active position. Still another feature of this invention is that it provides a switch assembly wherein the detent means includes a notch on the shuttle member and a detent lever engageable with the notch to maintain the shuttle member in the active position and the release means includes a release lever pivotable by the shaft member upon movement thereof from the neutral position in the second mentioned direction to pivot the detent lever out of engagement with the notch on the shuttle member.

These and other features of this invention will be readily apparent from the following specification and from the drawings wherein.

Figure 1:
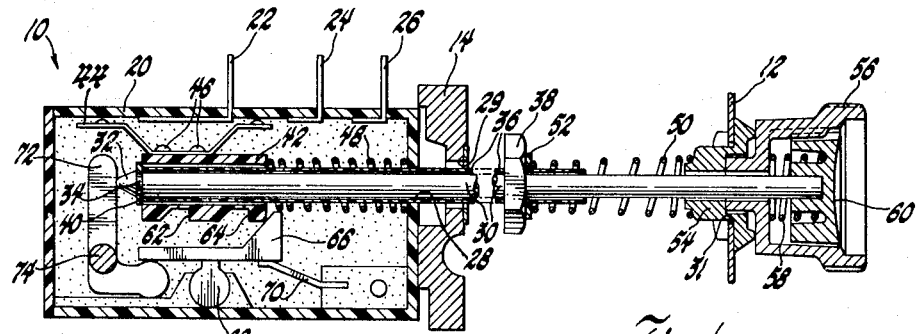
FIG. 1 is a sectional view of an electrical switch assembly according to this invention and showing the shuttle member in the inactive position and the shaft member in the neutral position.

Referring now to FIG. 1 of the drawings, an electrical switch assembly according to this invention is generally designated 10. In a preferred embodiment, the switch assembly 10 functions as a vehicle headlamp control switch. The switch assembly is accordingly preferably constructed as shown to be mounted on a vehicle instrument panel structure, such structure typically including spaced facia and inner reinforcing panel or brace indicated at 12 and 14 respectively.

The switch assembly 10 includes a housing member 20 fabricated from a conventional insulating-type material, such as hard rubber, and fixedly secured by conventional means, not shown, to the brace member 14. The housing member has integral electrical contacts and terminals 22, 24 and 26 fixedly secured thereto. As is conventional, terminal 22 is connected to an energy source such as the vehicle battery, not shown, and the terminals 24 and 26 are connected to respective vehicle exterior illumination circuits, not shown. By electrically connecting terminal 22 with terminal 24 for example, a parking lamp circuit may be energized while connection with terminal 26 may energize both the headlamp and parking lamp circuits.

With further reference to FIG. 1, the housing member 20 has an aperture 28 therein in axial alignment with an aperture 29 in brace 14 and an aperture 31 in instrument panel facia 12. A shaft member 30 having a tapered end 32 and a groove 34 adjacent thereto is mounted on the housing member in aperture 28 for bodily shiftable movement along a longitudinal axis of the housing member and projects through apertures 29 and 31 in the brace 14 and instrument panel 12. An insulating sleeve member 36, slidably mounted on shaft member 30, projects through aperture 28 in the housing member and has a nut 38 threadably received on one end thereof. A retaining ring 40 is mounted in groove 34 on the shaft member and prevents sleeve member 36 from sliding off the tapered end of the shaft member.

A shuttle member 42, having conductor means 44 in the form of a metallic bridge element fixedly secured thereto by screws 46, is slidably mounted on sleeve member 36. A compression spring 48 coiled about sleeve member 36 reacts at one end thereof against housing member 20 and at the other end against shuttle member 42 to thereby bias the latter leftwardly as viewed in FIG. 1.

A compression spring 50 is coiled about shaft member 30 and sleeve member 36 and reacts at one end thereof against washer 52 pressing against nut 38. The other end of spring 50 reacts against a portion of a grommet or guide member 54 fixedly secured to instrument panel facia 12 in the aperture 31. Grommet 54 slidably receives a portion of shaft member 30 projecting past the instrument panel. The compression spring 50 thus biases the sleeve member 36 leftwardly, FIG. 1, into engagement with retaining ring 40 so that both the shaft member 30 and the sleeve member are biased leftwardly.

A control knob assembly is mounted on the outboard end of o shaft member 30 and includes a collar member 56 slidably mounted on the portion of shaft member 30 projecting past instrument panel 12. The knob assembly further includes a compression spring 58 coiled about the shaft member 30 and captured between the collar member 56 and a button member 60 threadedly received on the outboard end of the shaft member 30 and slidably received within the collar member 56.

Figure 2:
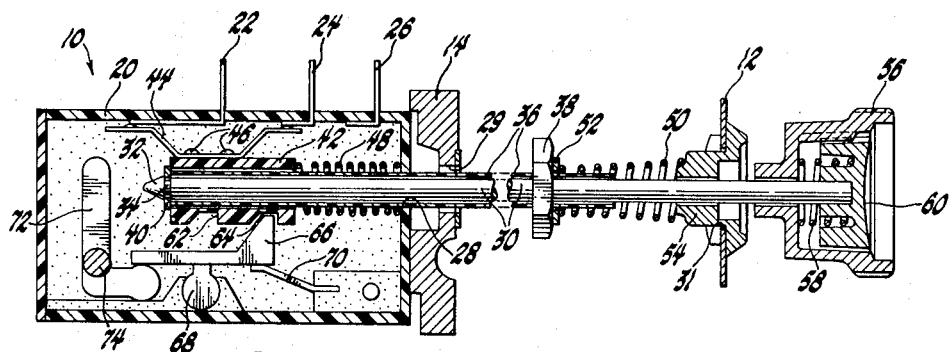
FIG. 2 is similar to FIG. 1 but showing the shuttle member in one active position thereof and the shaft member in a corresponding momentarily shifted position.
Figure 3:
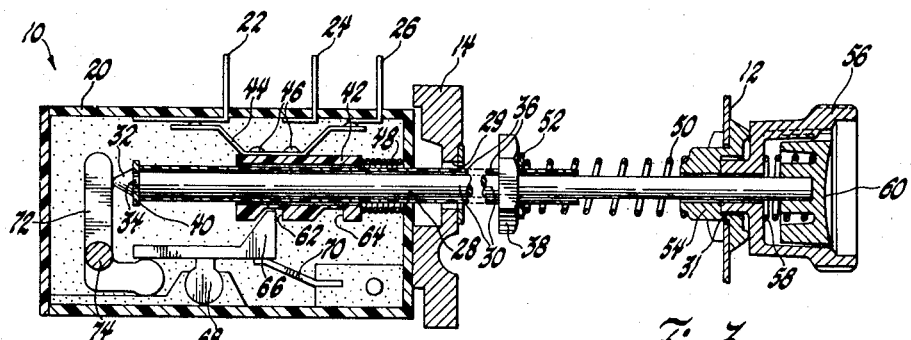
FIG. 3 is similar to FIG. 1 but showing the shuttle member in a second active position thereof and the shaft member in the neutral position thereof.

With reference now to FIGS. 1, 2 and 3, the compression springs 50 and 58 cooperate to resiliently maintain the shaft member 30 in a defined neutral position, FIG. 1. More particularly, compression spring 50 urges the sleeve member 36 and the shaft member 30 leftwardly until the compression spring 58, reacting on the fixed instrument panel facia 12 through collar member 56 seated on grommet 54, generates an opposing force on the button member 60 equal to the force generated on the nut 38 by compression spring 50. From the neutral position so defined, button member 60 may be manually depressed to bodily shift the shaft member leftwardly or the collar member 56 may be grasped and pulled rightwardly to compress the spring 58, FIG. 2, and bodily shift the shaft member rightwardly. After cessation of either form of motivation, the springs 50 and 58 cooperate to return the shaft member 30 to the neutral position thereof as described hereinbefore.

The shuttle member 42 is biased leftward by spring 48 to an inactive position wherein conductor means 44 lies remote from the terminals 22, 24 and 26 so that the exterior vehicle illumination system is deenergized. Ring 40 provides an abutment stop on shaft member 30 against such bias. When the shaft member 30 is bodily shifted rightward from the neutral position thereof, as shown in FIG. 2, through manipulation of collar member 56, the retaining ring 40 carries the sleeve member 36 and the shuttle member 42 rightward as a unit with the shaft member. The shuttle member 42 may thus be shifted to a first active position, FIG. 2, wherein conductor means 44 electrically connects terminals 22 and 24 or to a second active position, FIG. 3, wherein conductor means 44 electrically connects terminals 22 and 26.

Detent means are provided within the housing member 20 to releasably maintain the shuttle member 42 in either of its active positions and include a pair of detent notches 62 and 64 integral with the shuttle member 42, a detent lever 66 pivotally mounted on the interior of housing member 20 at 68 and a cantilever-type spring 70 mounted on the interior of housing member 20 and urging the detent lever 66 in a counterclockwise direction. An L-shaped release lever 72 pivotally mounted on the interior of housing member 20 at 74 has one leg thereof adjacent detent lever 66 and the other leg adjacent tapered end 32 of shaft member 30. Counterclockwise pivotal movement of the release lever thus initiates clockwise pivotal movement of detent lever 66 against the action of cantilever spring 70.

In operation, from the neutral position of the shaft member 30 and the inactive position of the shuttle member 42, FIG. 1, manipulation of collar member 56 initiates rightward shifting movement of shuttle member 42 as a unit with the sleeve member 36 and shaft member 30 toward the first active position, FIG. 2. The leading edge of the shuttle member, under such shifting movement, compresses spring 48 and cams the detent lever 66 clockwise against spring 70 until the detent lever is urged by spring 70 into notch 64. Release of the collar member 56, then, allows springs 50 and 58 to return the sleeve member 36 and shaft member 30 to the neutral position of the latter independently of the shuttle member 42 which is maintained in the first active position thereof with spring 48 held compressed by the detent lever 66.

The shuttle member 42 may be placed in the second active position by even further rightward shifting movement to the position shown in FIG. 3. Under such circumstances, the beveled trailing edge of the notch 64 cams the detent lever 66 clockwise to permit rightward movement of the shuttle member until the detent lever is urged by spring 70 into notch 62. Release of the collar member 56, then, allows springs 50 and 58 to return the sleeve member 36 and shaft member 30 to the neutral position of the latter, FIG. 3, independently of the shuttle member 42 which is maintained in the second active position thereof with spring 48 held further compressed by the detent lever 66.

Figure 4:
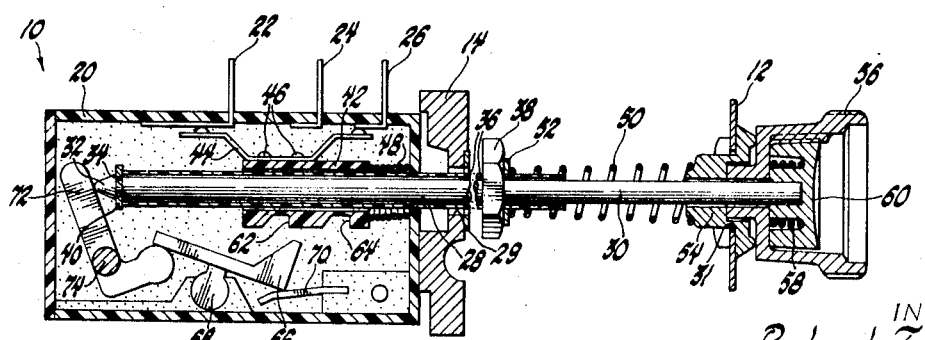
FIG. 4 is similar to FIG. 1 but showing the shaft member in momentarily shifted detent means releasing position.

Release of the shuttle member 42 from either active position thereof is accomplished through bodily shiftable movement of the shaft member 30 from the neutral position thereof in the direction opposite to that required to bring the shuttle member into the active positions. More particularly, with reference to FIGS. 3 and 4, with the shuttle member 42 in the second active position thereof and the shaft member in the neutral position thereof, FIG. 3, the button member 60 is manually depressed by the finger within the collar member 56 to bodily shift the shaft member 30 leftward and compress spring 58 against seated collar member 56. The tapered end 32 of the shaft member makes contact with the adjacent leg of the release lever 72 and pivots the latter counterclockwise about pivot 74, FIG. 4. Simultaneously, pivotal movement of release lever 72 initiates clockwise pivotal movement of detent lever 66 about pivot 68 against the action of spring 70, which pivotal movement lifts the detent lever out of engagement with the notch 62, FIG. 4. Upon disengagement of the detent lever from the notch, the compressed spring 48 rapidly forces the shuttle member 42 along the sleeve member 36 from the active position thereof to the inactive position. Release of pressure from the button member 60, then, permits cooperation between the springs 50 and 58 to reposition the shaft member 30 in the neutral position thereof while the spring 70 repositions the detent lever 66 and release lever 72 for another detenting cycle as described hereinbefore.

From the foregoing description it will be apparent that to deenergize the exterior vehicle illumination system the operator must depress button 60 within the collar member 56. More particularly, with the collar member thus shielding the button member, it is virtually impossible to inadvertently bump the knob assembly and deactivate the switch. Rather, an operator must put forth a conscious effort to extend a finger into the collar member and then depress the button.

I claim:

1. In combination in an electrical switch assembly, a housing member having a plurality of terminal means thereon, a shaft member, means mounting said shaft member on said housing member for movement in two opposite directions from a neutral position, a shuttle member having conductor means thereon, means mounting said shuttle member on said shaft member for movement relative thereto, means operable upon movement of said shaft member from said neutral position in one of said two opposite directions to move said shuttle member as a unit therewith from an inactive position to an active position, detent means operable to releasably maintain said shuttle member in said active position, resilient means operable to restore said shaft member to said neutral position independently of said shuttle member following movement of said shaft member from said neutral position in either of said two opposite directions, and release means operable upon movement of said shaft member in the other of said two opposite directions from said neutral position to release said detent means for movement of said shuttle member from said active position thereof.

2. In combination in an electrical switch assembly, a housing member having a plurality of terminal means thereon, a shaft member, means mounting said shaft member on said housing member for movement in either of two opposite directions from a neutral position, a shuttle member having detent-engaging means and conductor means thereon, means mounting said shuttle member on said shaft member for movement relative thereto, means operable upon movement of said shaft member from said neutral position in one of said two opposite directions to move said shuttle member as a unit therewith from an inactive position to an active position, a detent lever pivotally mounted on said housing member and engageable with said detent-engaging means on said shuttle member to releasably maintain the latter in said active position thereof, first resilient means operable to restore said shaft member to said neutral position thereof independently of said shuttle member following movement of said shaft member in either of said two opposite directions from said neutral position, release means operable upon movement of said shaft member in the other of said two opposite directions from said neutral position to pivot said detent lever out of engagement with said detent-engaging means, and second resilient means operable to restore said shuttle member to said inactive position thereof upon disengagement of said detent lever from said detent-engaging means.

3. In an automobile-type vehicle including an instrument panel therein and having at least one aperture, a headlamp switch assembly comprising a housing member having a plurality of terminal means thereon, means mounting said housing member in fixed relationship to said instrument panel and on one side thereof, a shaft member having a knob assembly on one end thereof, said knob assembly including a button member fixedly secured to one end of said shaft member, a collar member slidably receiving said button member and slidable on said shaft member and first resilient means urging said collar member away from said button member, means mounting said shaft member on said housing member for bodily shiftable movement along a longitudinal axis of the latter in two opposite directions from a neutral position and with said knob assembly being situated on the side of said instrument panel opposite to said housing member, said collar member in said neutral position of said member being seated against said instrument panel with said first resilient means urging said shaft member in one of said two opposite directions, second resilient means urging said shaft member in the other of said two opposite directions, said first and second resilient means being operable to return said shaft member to said neutral position following movement thereof in either of said two opposite directions, a shuttle member including conductor means and at least one detent notch, means mounting said shuttle member on said shaft member for movement relative thereto, means operable upon bodily shiftable movement of said shaft member from said neutral position in said one direction to bodily shift said shuttle member as a unit therewith from an inactive position to an active position, a detent lever, means pivotally mounting said detent lever on said housing member, said detent lever being engageable with said detent notches on said shuttle member to maintain the latter in said active position, said first and second resilient means being operable to return said shaft member to said neutral position independently of said shuttle member, a release lever, means mounting said release lever on said housing member with one portion thereof situated adjacent said detent lever and another portion thereof situated adjacent the other end of said shaft member in said neutral position of the latter, said release lever being operable upon pivotal movement thereof to pivot said detent lever out of engagement with said detent notch, means on said shaft member operable upon movement of the latter from said neutral position in said other of said two opposite directions to pivot said release lever to disengage said detent lever from said detent notch, and third resilient means operable upon disengagement of said detent lever from said detent notch to restore said shuttle member to said inactive position thereof.